United States Patent
Watanabe

(10) Patent No.: US 6,976,196 B2
(45) Date of Patent: Dec. 13, 2005

(54) ERROR DETECTING METHOD AND DEVICE, INFORMATION STORING AND REPRODUCING DEVICE AND MAGNETIC DISK DRIVE

(75) Inventor: Yoshiju Watanabe, Ninomiya (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 460 days.

(21) Appl. No.: 10/364,746

(22) Filed: Feb. 10, 2003

(65) Prior Publication Data
US 2003/0182606 A1 Sep. 25, 2003

(30) Foreign Application Priority Data
Feb. 20, 2002 (JP) .............................. 2002-042642

(51) Int. Cl.$^7$ .................. G11C 29/00; G06F 11/00; G11B 27/36; G11B 5/09
(52) U.S. Cl. .................. 714/718; 714/798; 360/53; 360/31
(58) Field of Search .................. 714/718, 798, 714/814, 811, 775, 763; 360/31, 53, 51; 369/53.1, 369/53.35, 53.42, 53.44

(56) References Cited

U.S. PATENT DOCUMENTS

| | | | |
|---|---|---|---|
| 6,084,741 A * | 7/2000 | Kim | 360/78.04 |
| 6,092,232 A * | 7/2000 | Nagai et al. | 714/769 |
| 2001/0010604 A1 | 8/2001 | Esumi | |
| 2004/0027947 A1 * | 2/2004 | Asano et al. | 369/47.31 |

FOREIGN PATENT DOCUMENTS

JP      09-145634      6/1997

* cited by examiner

Primary Examiner—Christine T. Tu
(74) Attorney, Agent, or Firm—Townsend and Townsend and Crew LLP

(57) ABSTRACT

In order to precisely detect latent defects where a data-synchronizing signal is to be stored despite changes in the rotation of an information storage medium, a region data detection is used during a defect detection mode that is longer in the back-and-forth direction than a data-synchronizing signal used during a normal operation mode. The data detection region may be increased by the amount of change in the rotation. Thus, latent defects that may, due to a change in the rotation of the storage medium, come into agreement with the position of a data-synchronizing signal utilized during a normal mode of operation may be reliably detected, maintaining a high precision by taking a change in the rotation of the storage medium into consideration.

20 Claims, 14 Drawing Sheets

(BLOCK DIAGRAM OF STORAGE SYSTEM)

ERROR DETECTING METHOD AND DEVICE, INFORMATION STORING AND REPRODUCING DEVICE AND MAGNETIC DISK DRIVE

BACKGROUND OF THE INVENTION

1. Field of the Invention

This invention relates to technology for storing and reproducing information. More particularly, the invention relates to technology that can be effectively applied to a method of detecting defect in the information storage medium in the information storing/reproducing device, and to a defect detecting device.

2. Description of the Related Art

A general method of detecting defect will now be described with reference to a magnetic disk drive.

The magnetic disk drive stores and reproduces information into, and from, a storage medium for each of the sectors that are unit storage regions. FIG. 15 is a diagram illustrating a sector format. Each sector includes a PLO-SYNC 51 for drawing a PLL (phase locked loop) for synchronizing the clocks, a data-synchronizing signal 52 for obtaining a demodulation timing signal of a code modulated by detecting a DATA start position, a DATA portion 53 for really storing and reproducing data, and a CRC portion/ECC portion 54 for detecting and correcting defect. A GAP portion 55 which is a pattern for absorbing various kinds of delay times exists among the sectors.

A magnetic disk which is an information storage medium used for a magnetic disk drive contains the so-called defect region which is not suited for storing and reproducing information. The defect region occurs when the magnetic material for storing information is not uniformly spread on the storing surface in the step of production, when information is not stored due to dirt and scars on the storing surface, when signals for reproducing information are not produced to a sufficient degree or when large noise is superposed on the reproducing signals. Defect region could stem even from the so-called TA (thermal asperity) that occurs when the reproducing head comes into contact with the surface of the magnetic disk due to ruggedness formed by some reasons on the storing surface of the magnetic disk. The defect region usually maintains undesired properties and is not suited for storing information up to the future or for reproducing information. Therefore, the magnetic disk drive checks defect regions in advance, and registers the detected defect regions so that they will not to be used as data regions thereby to decrease defect in the information in the magnetic disk drive.

There has been proposed a method of detecting defect regions by taking the practical conditions of use into consideration. For example, Japanese Patent Laid-Open No. 145634/1997 discloses an defect detecting method by taking into consideration the defect correcting ability of a storing/reproducing device that is really used. Occurrence of error is detected by correcting error for each sector which is an information storage unit, and the defect in the sector is registered depending upon the number of error bytes corrected by correcting error.

This method makes it possible to omit the registration of small defects compared to error correction ability of the storing/reproducing device that is really used and, hence, to improve the yield of production by efficiently registering defect and to improve performance of the device by decreasing the frequency of substitute processing.

There has further been proposed a method of improving performance for detecting data synchronizing signals. According to, for example, Japanese Patent Laid-Open No. 216743/2001, performance for detecting data synchronizing signals is improved by utilizing, as part of the data synchronizing signal, the stored data of at least just before or just after the collated portion at the time when the data-synchronizing signal is detected during the reproduction. Namely, this method is to suppress defect at the time of reproducing information, and permits much defect. In detecting defect, it is important that a portion that may develop defect is reliably detected; i.e., portions that may develop defect are permitted to develop defect as much as possible so as to be detected. Therefore, permitting the occurrence of much defect is not suited for detecting defects.

The above method based upon the correction of error has a prerequisite in that the defect must be detected in a unit of sector and that the data must be correctly synchronized for properly correcting error. As for the DATA portion, CRC portion and ECC portion, defect can be detected as expected. However, error is not corrected for the portions where the data synchronizing signals are stored for synchronizing the data. Therefore, the data synchronizing signals are not capable of imparting a difference to the ability for correcting error between when defects are checked like in the data portion and when the data are really stored and reproduced using the device. This means that no margin is maintained to the data-synchronizing signal portion.

Further, a correct detection of the data-synchronizing signal is very important for demodulating the code of the subsequent DATA portion and, hence, a correct detection is always requested. That is, even when the data of which the code is demodulated in the DATA portion are flawless and have a very small error rate, a failure to detect the data-synchronizing signal which is usually about several bytes makes it difficult to correctly demodulate the code of the subsequent DATA portion of several tens to several hundreds of bytes. It is therefore desired that a defect in the data-synchronizing signal portion is detected as much as possible and is registered.

Further, in the device for storing and reproducing information by rotating a disk-like storage medium, such as a magnetic disk drive, a slight change occurs in the rotation of the storage medium. In really detecting defects and storing information as a device, therefore, the position where the data-synchronizing signal is stored differs every time when the information is rewritten. In detecting defect, therefore, defect does not exist in the data-synchronizing signal portion and is not detected. In subsequently storing information, the position for storing the data-synchronizing signal differs due to a change in the rotation of the storage medium resulting in an erroneous detection of the data-synchronizing signal and making it often difficult to reproduce the DATA portion that follows the data-synchronizing signal.

In order to correctly detect the data-synchronizing signal by taking the practical use into consideration, it is desired to maintain a margin to the defect in the data-synchronizing signal portion, to register the defect by detecting defect in the data-synchronizing signal portion as much as possible, and to detect the defect in the data-synchronizing signal by taking a change in the rotation of the storage medium into consideration, i.e., to precisely detect the defect at a position where the data-synchronizing signal is likely to be stored.

It is further desired to shorten the processing time for checking the defect.

Further, it is desired to improve reliability of the data-synchronizing signal or to decrease the region of the data-synchronizing signal portion by an amount that meets the improvement in the reliability of the data-synchronizing signal.

In the information storing/reproducing device, a reduction in the region of the data-synchronizing signal portion makes it possible to increase the region for storing/reproducing information, and to increase the storage capacity of information of the information storing/reproducing device owing to the improvement in the so-called format efficiency. Or, upon decreasing the region of the data-synchronizing signal portion and decreasing the information storing density per unit area in the information storage region, it is allowed to decrease error in the storage and reproduction and to improve performance of the information storing/reproducing device.

SUMMARY OF THE INVENTION

In this invention, first, when a defect is detected in the information storage medium, the synchronism of data is detected by using a data-synchronizing signal longer than the data-synchronizing signal that is usually used for reproducing the stored information inclusive of retry. By using the long data-synchronizing signal, the synchronism of data that may not be detected is, then, detected as a defect in the information storage medium, making it possible to check a defect in the data-synchronizing signal by taking a change in the rotation of the storage medium into consideration. The length corresponds to a change in the rotation which is permissible before and after the ordinary data-synchronizing signal. Since the long data-synchronizing signal is used, it is allowed to utilize the PLO-SYNC preceding the data-synchronizing signal as well as a signal in the DATA portion succeeding the data-synchronizing signal. By rendering the signal in the DATA portion to be the same signal as PLO-SYNC, further, it becomes possible to make the precision of detection uniform. These factors decrease the rate of detecting the data-synchronizing signal when a defect is detected, which, however, improves performance for detecting the defect.

Second, provision is made of a data-synchronizing signal detecting device for detecting the defect. When a defect is detected, it is possible to detect data synchronism corresponding to the long data-synchronizing signal for detecting defect. When the data synchronism cannot be detected, this is registered as a defect to maintain margin for the defect in the data-synchronizing signal portion and to improve reliability of the information storing device.

Third, provision is made of pattern collation means for detecting defect. When a defect is detected, pattern collation is conducted by pattern collation means for detecting defect over a range including regions preceding and succeeding the data-synchronizing signal in order to detect even an error of one bit.

When the pattern collation for detecting defect cannot be conducted due to an error, then, this is registered as a defect to maintain margin for the defect in the data-synchronizing signal portion in order to improve reliability of the information storing device. When a defect is detected, further, the pattern collation can be conducted at one time by the pattern collation means for detecting defect over a range including regions preceding and succeeding the data-synchronizing signal. Therefore, the defect can be detected inclusive of a portion where a change in the rotation is taken into consideration making it possible to decrease the steps for detecting defects.

Further, a defect can be detected in advance in the region for storing the data-synchronizing signal inclusive of a portion of taking a change in the rotation into consideration, and only those sectors free of defect can be used for the region of storing the data-synchronizing signal. In really storing or reproducing information, therefore, no defect is involved in the detection of the data-synchronizing signal and, hence, attention may be given to the deterioration of the signals due to noise. Therefore, error little occurs in detecting the data-synchronizing signals, thereby to improve performance for detecting the data-synchronizing signals. Further, an increment in the performance for detecting the data-synchronizing signals can be utilized for maintaining performance for detecting the data-synchronizing signals while decreasing the region for the data-synchronizing signals. In this case, the region for the data-synchronizing signal that is decreased can be utilized for storing information to improve format efficiency and to increase the storage capacity of the information storing/reproducing device. Or, the region for the data-synchronizing signal that is decreased can be utilized for lowering the storing density per a unit area of information, in order to decrease error in the data thereby to improve not only performance for detecting the data-synchronizing signal but also for improving reliability for storing and reproducing information of the information storing/reproducing device. As for the defect that occurs with the passage of time in the region for the data-synchronizing signal, the defect is detected with precision at the time when the defect is detected, so that the factor of occurrence can be decreased.

According to this invention as described above, defect is precisely detected at a position where the data-synchronizing signal is likely to be stored in the information storage medium, so that latent defect in the medium is revealed, whereby reliability improve of the information storage medium is attained.

This invention further makes it possible to shorten the processing time for detecting the defect in the information storage medium.

The invention is further capable of improving reliability of the stored data due to improved reliability in the data-synchronizing signal, and improving the format efficiency due to a decrease in the region of the data-synchronizing signal portion by an amount accomplished by the improvement in the reliability of the data-synchronizing signals.

DETAILED DESCRIPTION OF THE INVENTION

Embodiments of the invention include an apparatus and method for detecting defects in a storage medium.

Figure 1:
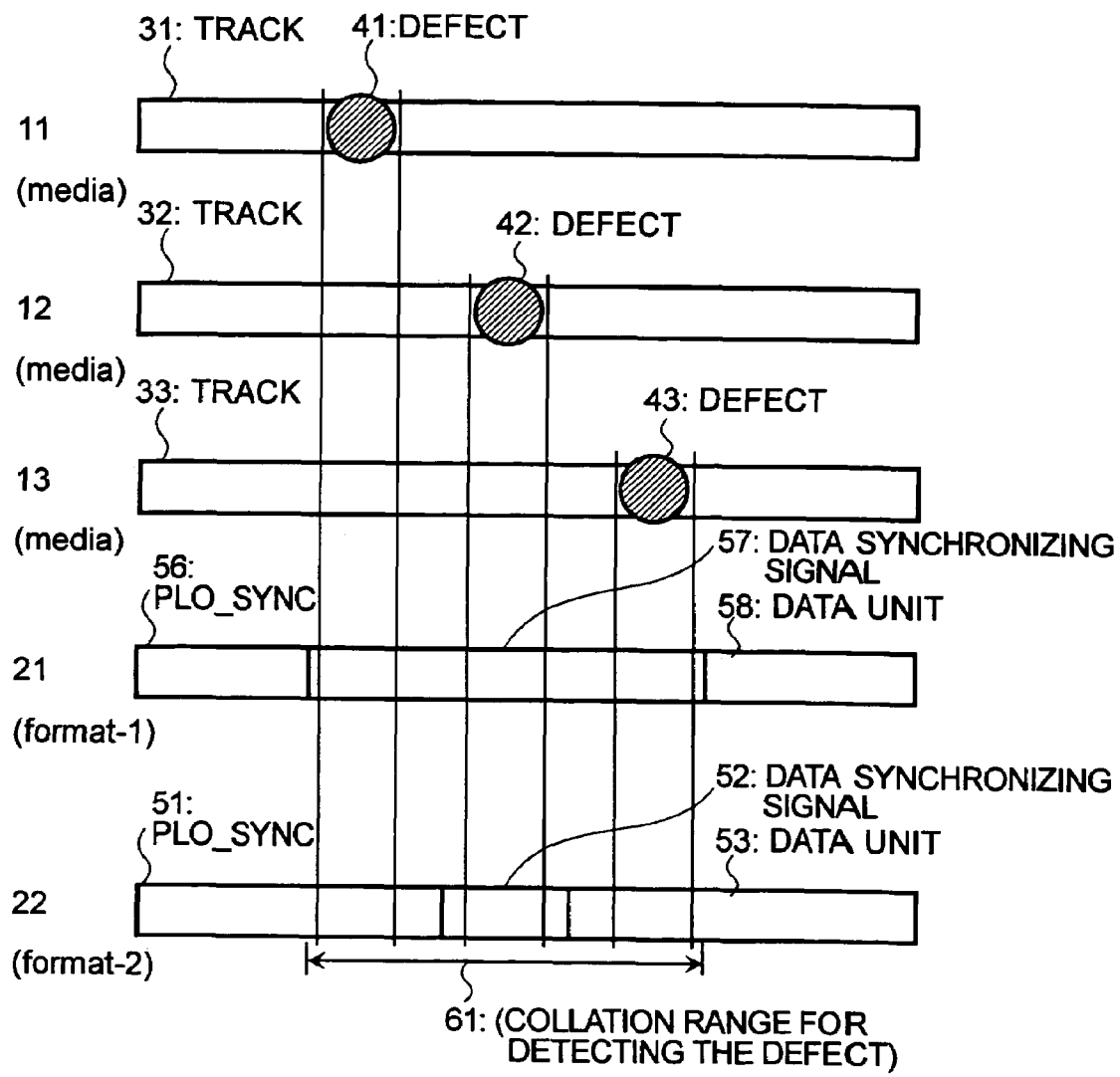
FIG. 1 is a schematic diagram illustrating a relationship between defect positions in the storage medium and the format according to a defect detecting method of a first embodiment of the invention in comparison with a conventional reference art.

FIG. 1 illustrates the storing position of the storage medium and the format according to the first embodiment of the invention. In an information storing/reproducing device using a disk-like storage medium such as a magnetic disk drive, information is stored in a region called track arranged in concentric on the disk-like storage medium. A storage medium 11 in FIG. 1 depicts a portion of the track in which information is stored on the recording medium. A track 31 has a defect 41 at an illustrated portion that is not suited for storing and reproducing information. A format in which information is stored on the track 31 is represented by a format 22. The format 22 includes a PLO-SYNC portion 51, a data-synchronizing signal portion 52, and a DATA portion 53. When the format 22 is stored on the track 31, the portion of the defect 41 comes into the region of PLO-SYNC 51. When the data are to be reproduced in the thus stored state, the defect 41 is drawn by the PLL that synchronizes the clocks and comes to the last portion of PLO-SYNC 51. Therefore, the clock synchronization is completed before the defect 41 is reached. If the clocks are synchronous despite the defect 41, the subsequent data-synchronizing signal 52 and the DATA portion 53 are reproduced. As described above, however, the disk-like storage medium has changing factors such as a change in the rotation. Therefore, the format 22 is not stored in the same manner with respect to the defect 41 at all times but could become in agreement with the data-synchronizing signal portion 52 if the position for storage changes or if the timing is relatively increased. In this case, the data-synchronizing signal 52 is not correctly reproduced because of the defect 41.

As for the track 31, the format at the time when the defect is detected according to the first embodiment is represented by a format 21. The format 21 includes a PLO-SYNC 56, a data-synchronizing signal 57 for detecting defect and a DATA portion 58. The data-synchronizing signal 57 for detecting a defect is expanded backward and forward compared to the data-synchronizing signal 52 of the normal format 22. Therefore, the preceding PLOSYNC 56 and the succeeding DATA portion 58 have lengths that are shorter than those of the normal format 22. The data-synchronizing signal 57 is preferably expanded backward and forward by a length that meets a permissible amount of change in the rotation.

In one embodiment, the data-synchronizing signal 57 is strictly detected. Namely, data is synchronous only when all bits are in agreement in the region of the data-synchronizing signal 57. In the normal format 22, therefore, the defect 41 is in the PLO-SYNC 51 and the defect is overlooked. In the format 21, however, the defect 41 is in the data-synchronizing signal portion 57, and the data-synchronizing signal 57 is not detected due to the defect 41 and data is not reproduced. Therefore, upon detecting the fact that the data is not reproduced due to the defect 41, it is possible to detect the defect 41. The data-synchronizing signal portion 57 has a length larger than that of the data-synchronizing signal portion 52, and the defect can be detected for the region where the data-synchronizing signal 52 of the normal format 22 is likely to be stored due to a change in the rotation.

In the magnetic disk drive shipped using the defect detection technique of this embodiment, it is possible to reliably prevent failed reproduction of the data-synchronizing signal and the succeeding DATA portion caused by storing the data-synchronizing signal in a defect position even in a case where the position for storing the data-synchronizing signal is relatively changed due to a change in the rotation of the magnetic disk at the time of storing or reproducing data.

The storage medium 12 depicts a portion of the track in which information is stored on the storage medium. The track 32 contains defect 42 that is not suited for storing or reproducing information at a portion shown.

The format with which information is stored in the track 32 is the format 22 like the one described above. When the format 22 is stored in the track 32, the defect 42 comes into the region of the data-synchronizing signal 52. When the data are to be reproduced in this storage state, the data-synchronizing signal 52 is not detected due to the defect 42 and, hence, the defect 42 can be detected and registered.

However, when the format 22 is stored at a position which has been deviated with respect to the defect 42, caused by a change in the disc rotation at the time when the defect is detected for example, it then becomes probable that the data-synchronizing signal 52 is detected and the DATA portion 53 is reproduced, consequently, the defect 42 may not be detected (overlooked). When the defect 42 deviates to the portion of the PLO-SYNC 51, the clock synchronization may already have been completed before the defect 42 is reached, and the data can be reproduced if the clocks do not become out of synch due to the defect 42. Further, if the defect 42 deviates into the DATA portion 53, errors will occur in data reproduction due to the defect 42. As for the track 32, 5oo, the format 21 at the time of detecting defect is used to strictly detect the data-synchronizing signal 52. When the change is within a permissible range, the defect 42 exists in the data-synchronizing signal 52 which, therefore, is not detected due to the defect 42, and the data are not reproduced. Upon detecting the fact that the data are not reproduced due to the defect 42, then, it becomes possible to detect the defect 42.

Storage medium 13 also depicts a portion of the track in which information is stored on the storage medium. The track 33 contains a defect 43 that is not suited for storing or reproducing information at a portion shown. The format with which information is stored in the track 33 is the format 22. When the format 22 is stored in the track 33, the defect 43 comes into the region of the DATA portion 53. When the data are to be reproduced in this storage state, the data reproduced from the DATA portion 53 will develop error due to the defect 43. However, if the error is corrected even when a defect is detected by the method disclosed in Japanese Patent Laid-Open No. 145634/1997 described above, the DATA portion 53 is correctly reproduced due to the correction of error, and it becomes probable that the defect 43 is not detected.

Format 21 is also used to detect defect 43 on track 33. When the change in the position of storing the data-synchronizing signal 52 is within a permissible range, the defect 43 exists in the data-synchronizing signal 52 which, therefore, is not detected due to the defect 43, and the data are not reproduced. Upon detecting the fact that the data are not reproduced due to the defect 43, then, it becomes possible to detect the defect 43.

When it is attempted to conduct the same by a general method without relying upon the embodiment of the invention, it becomes necessary to provide a facility which suppresses the occurrence of disturbance in conducting the step of detecting defect, to detect the defect in a state where the position for storing the data-synchronizing signal changes little, to store again at least the position for storing the data-synchronizing signal in front or at the back from an average position, and to detect the defect again. In this case, too, the step for detecting the defect needs to be executed only one time according to the method of the invention, which is one-third the number of the steps without relying upon the present invention. In practice, however, even when there is provided a special facility that suppresses the occurrence of disturbance without relying upon the invention, there still remains a change in the rotation to some extent. If this is brought into consideration, therefore, it will be comprehended that the present invention offers a great advantage.

Figure 3:
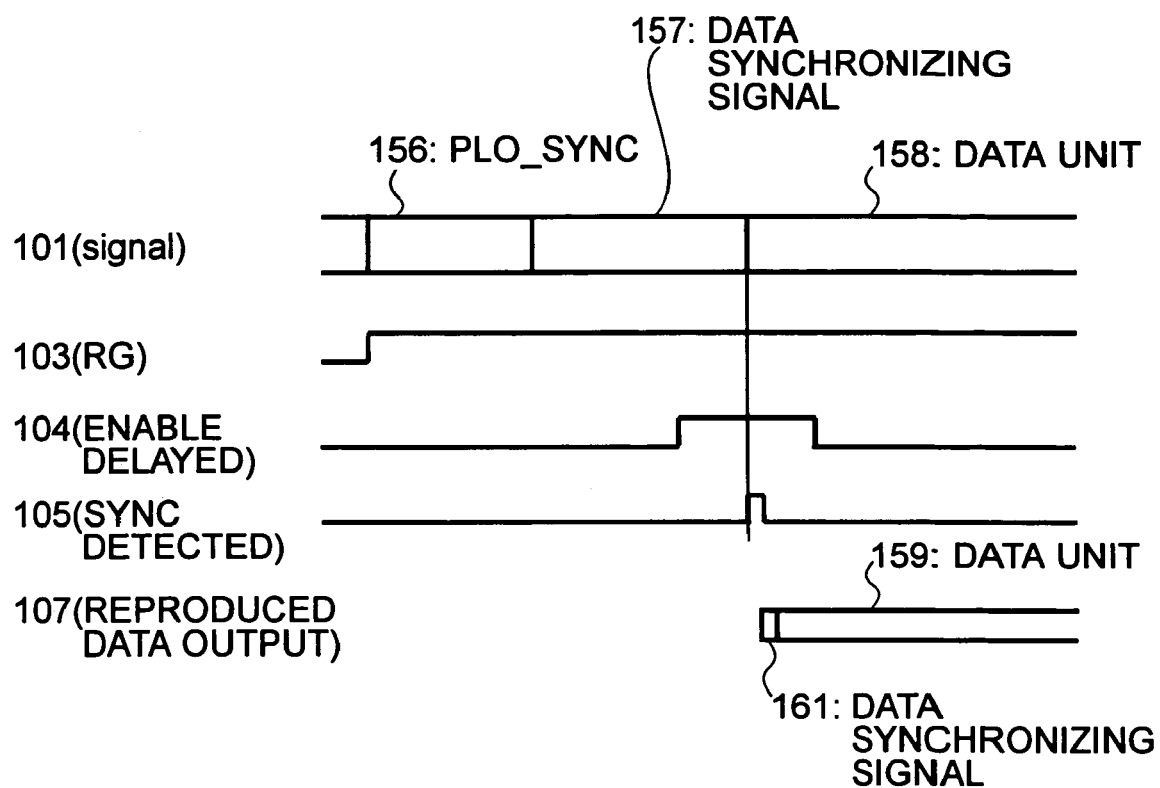
FIG. 3 is a time chart illustrating signals at each of the portions and sequences used for controlling timings for detecting the data-synchronizing signal according to the defect detecting method of the first embodiment of the invention.

FIG. 3 shows the time chart for conducting the detection of a defect by using the format 21 shown in FIG. 1. There is a reproduced signal 101 obtained by reproducing the stored data as in the format 21. The reproduced signal 101 is such that when the read gate signal (RG) 103 becomes active for the reproducing operation, there are reproduced PLO-SYNC 156, data synchronizing signal 57 and DATA portion 158 which correspond to the PLO-SYNC 56, data-synchronizing signal 52 and DATA portion 58, respectively in the format 21. Here, data synchronization is detected in a period of a delayed enable signal 104l which is for detecting the data-synchronizing signal 57 in the reproduced signal 101. If the data-synchronizing signal 57 is detected within this period, a SYNC detection output 105 is produced. Due to the SYNC detection output 105, there is produced a reproduced data output 107 including a data-synchronizing signal 161 and a DATA portion 159 of a signal obtained by demodulating the code of the DATA unit 158. When the SYNC detection output 105 is produced, there is no defect in the data synchronizing signal 52. Here, the data-synchronizing signal 52 for detecting defects has been expanded compared to the data-synchronizing signal 52 in the normal data reproduction which is not for detecting defects. Therefore, the enable signal 104 must be produced being delayed behind the enable signal which is for detecting the data-synchronizing signal 52.

Next, the configuration of a defect detecting device according to one embodiment will be described with reference to FIG. 5 and FIGS. 11 to 13.

Figure 11:
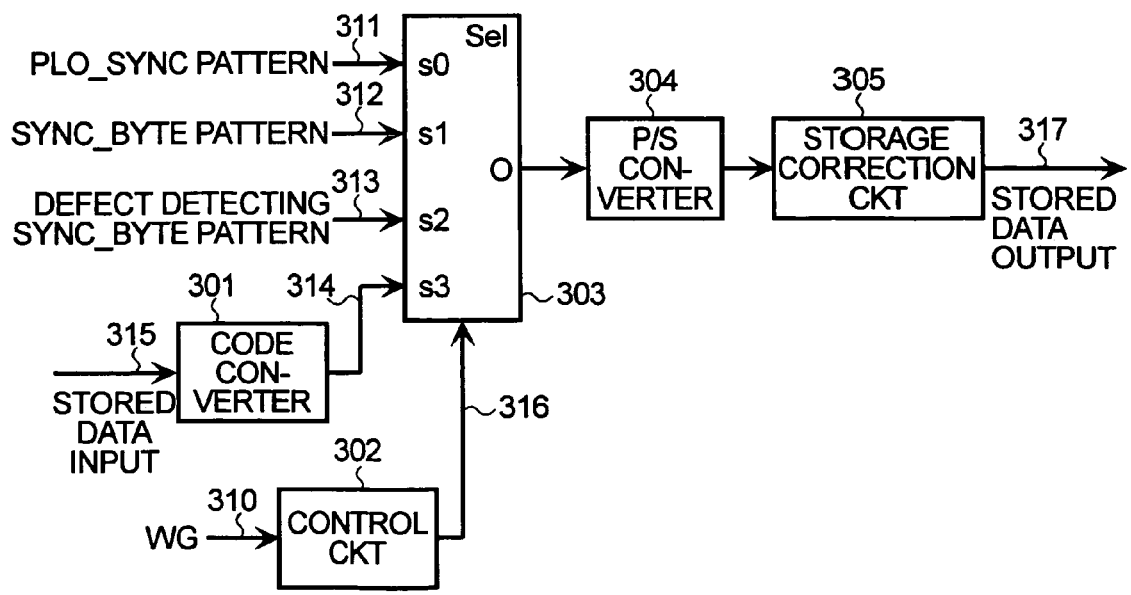
FIG. 11 is a block diagram illustrating a constitution of a storing system of a defect detecting device for effecting the defect detecting method according to the first embodiment of the invention.

FIG. 11 is a block diagram illustrating a storage system of a defect detecting device according to one embodiment of the present invention.

The defect detector includes a code modulator 301 (i.e., "code converter"), a control circuit 302, a selector 303, a P/S modulator 304 and a storage correction circuit 305.

Selector 303 receives a PLO-SYNC pattern 311, a SYNC-BYTE pattern 312, a defect detecting SYNC-BYTE pattern 313 and a modulated stored data 314 (DATA 314a, ECC 314b, GAP 314C) obtained by modulating the code of the stored data input 315 through the code modulator 301. The Selector output is controlled by the switching timing control signals 316 from the control circuit 302 in response to the asserts of the write gate signal 310 (WG).

Figure 12:
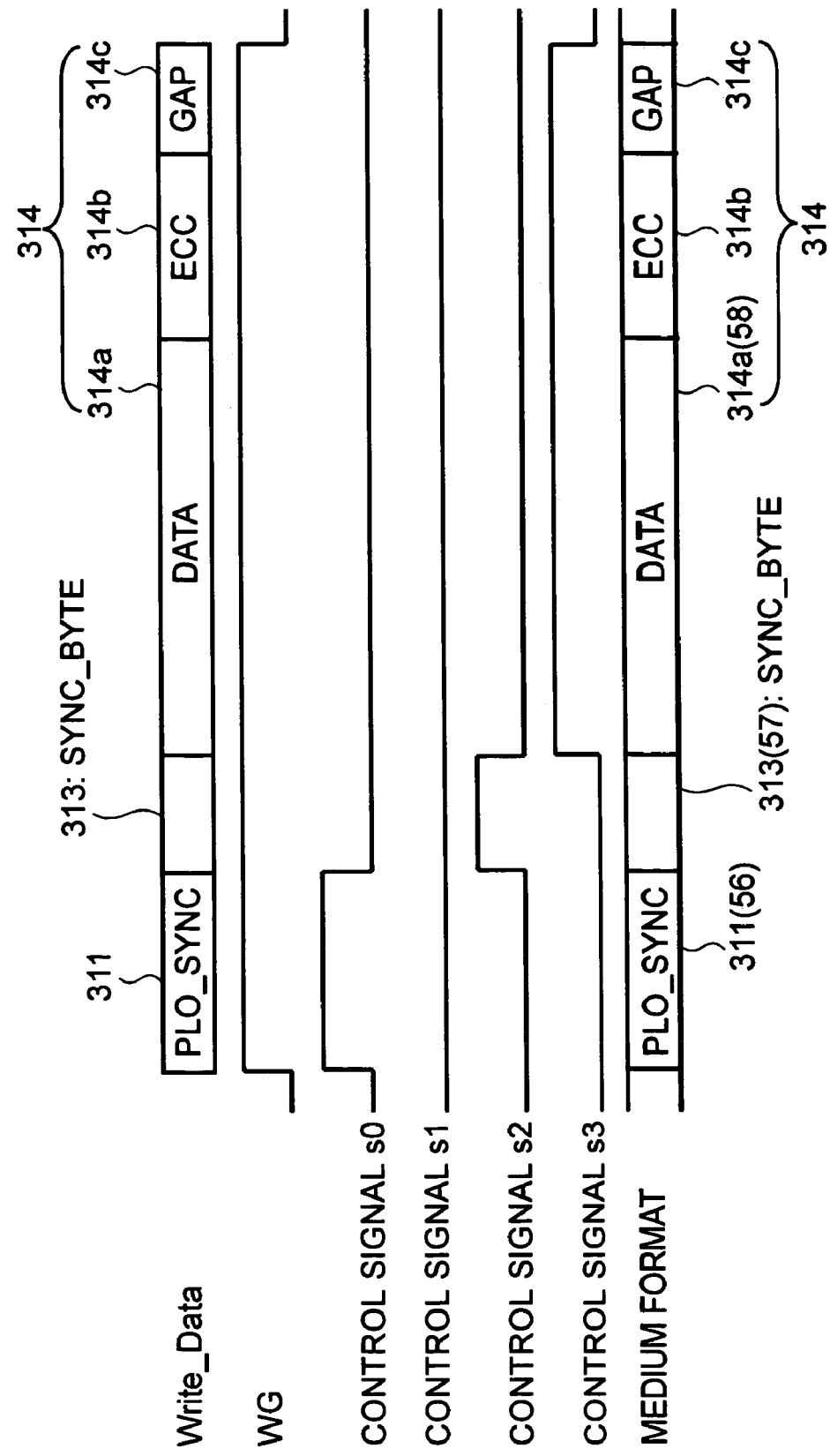
FIG. 12 is a time chart illustrating a timing control for detecting defect in the storing system of the defect detecting device for effecting the defect detecting method according to the first embodiment of the invention.
Figure 13:
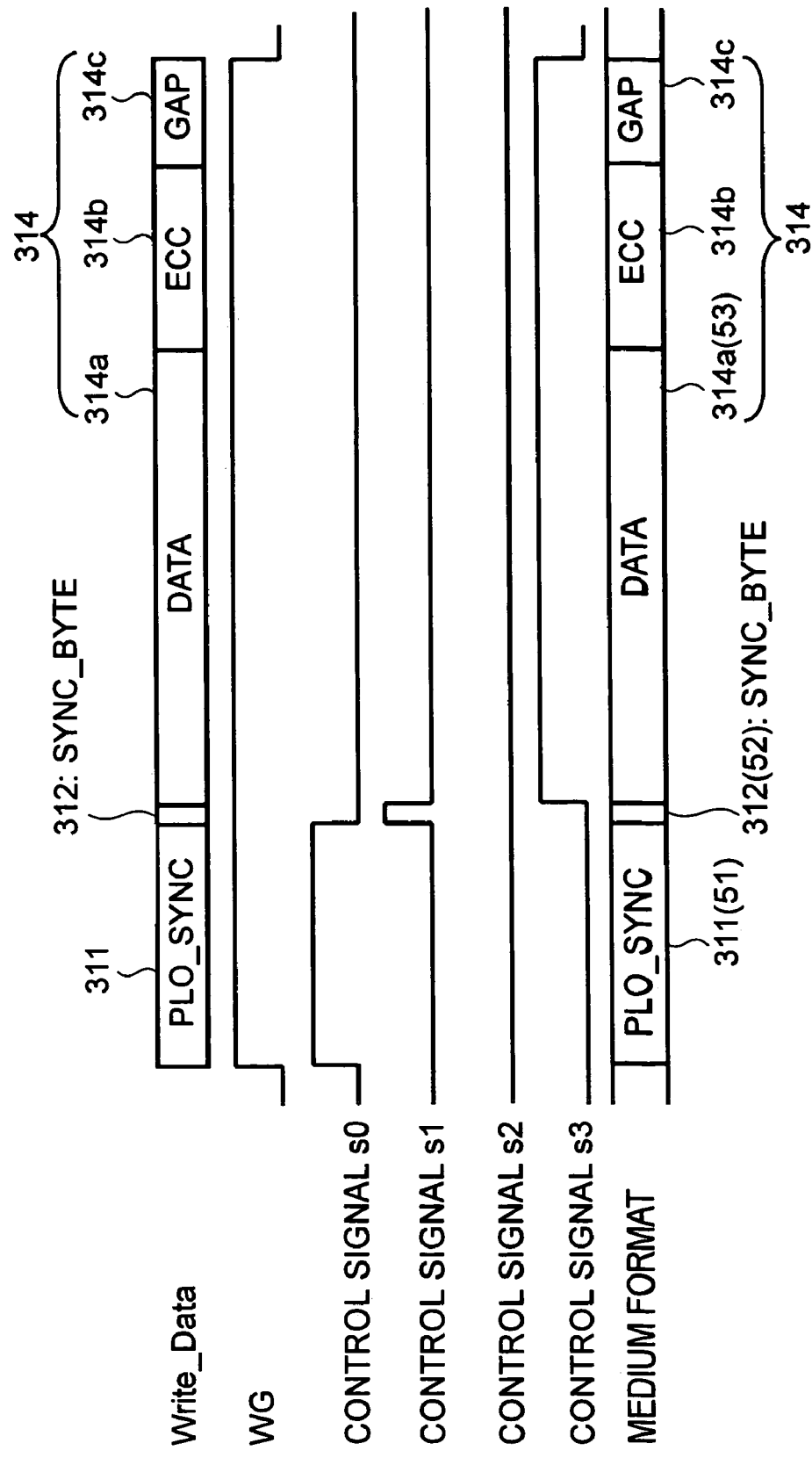
FIG. 13 is a time chart illustrating a timing control during the normal operation of the storing system of the defect detecting device for effecting the defect detecting method according to the first embodiment of the invention.

Time charts of FIGS. 12 and 13 illustrate each pattern of the time of detecting defect or at the normal time in the storage system of FIG. 11. During the normal storage, a SYNC-BYTE pattern 312 of a predetermined length is outputted by a control signal S1. When detecting a defect, the length of the defect detecting SYNC-BYTE pattern 313 and relative positions in the back-and-forth direction are controlled by a control signal S2.

In the storage system of this embodiment as described above, the defect detecting SYNC-BYTE pattern 313, at the time of detecting the defect, is expanded to be longer than the normal SYNC-BYTE pattern 312 used during the normal storage by controlling the timings of the control signal S0, control signal S2 and control signal S3 and, at the same time, the positions with respect to the preceding PLO-SYNC pattern 311 and the succeeding DATA 314a are also arbitrarily controllable.

Figure 5:
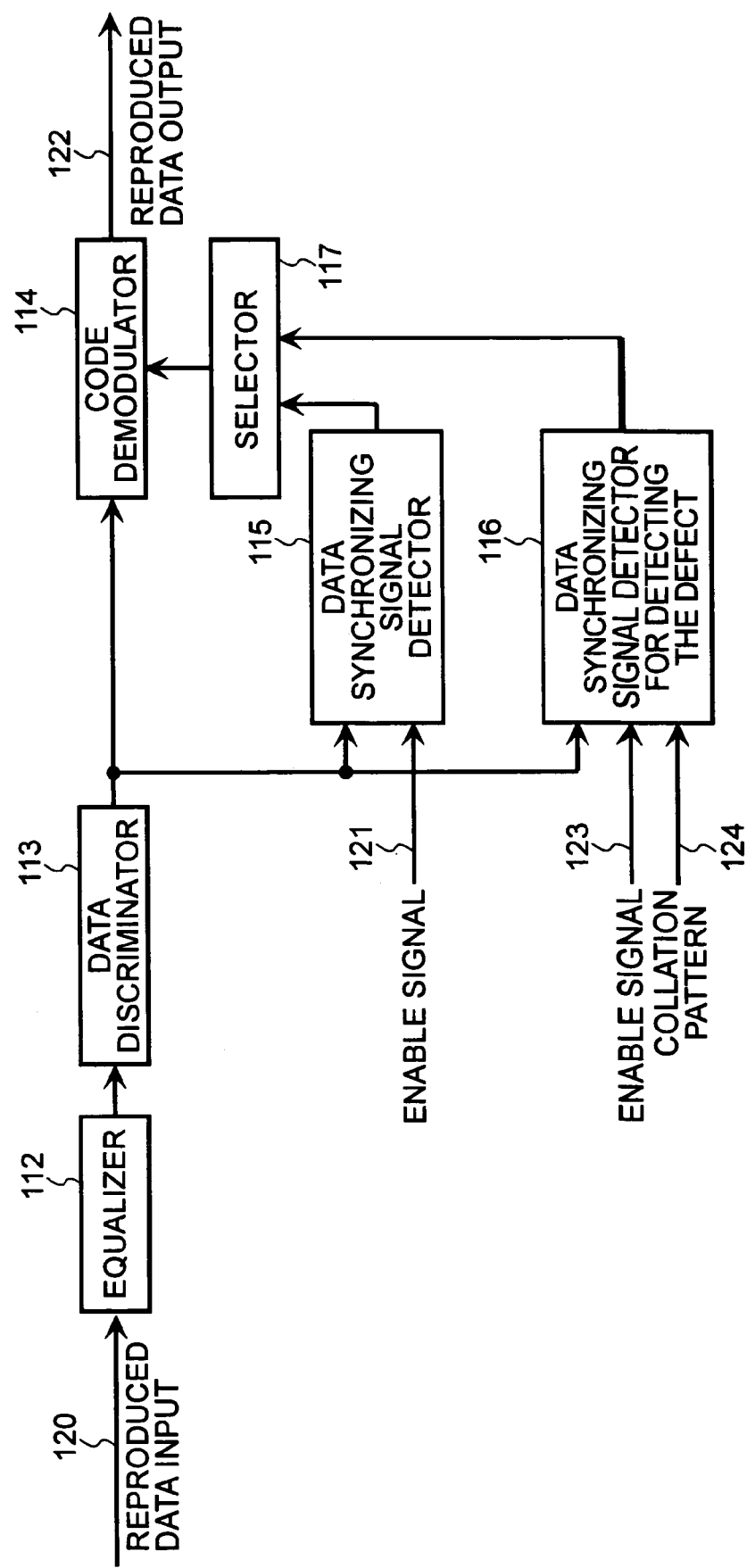
FIG. 5 is a block diagram illustrating a constitution of a defect detecting device for carrying out the defect detecting method according to the first embodiment of the invention.

FIG. 5 is a diagram illustrating the configuration of a reproduction system for detecting a data-synchronizing signal in a defect detecting device according to one embodiment of the present invention. Data stored on the information storage medium using format 21 of FIG. 1 is reproduced and provided as reproduced, data input 120 to an equalizer 112. The equalizer 112 equalizes the signals and outputs them. A data discriminator 113 receives the output from the equalizer, discriminates the data, and produces a result of data discrimination. The output of data discrimination is inputted to a code demodulator 114, a data synchronizing signal detector 115 and to a data-synchronizing signal detector 116 for detecting defects. Data-synchronizing signal detector 115 is used reproducing the data when the storage system is operating in a normal mode., and receives an enable signal 121. If necessary, it also receives parameters for detecting data-synchronizing signals. The data-synchronizing signal detector 116 for detecting defects is used for detecting defects, and receives an enable signal 123 and a collation pattern 124. The enable signal 123 is for delaying the enable signal 121 during the normal reproduction of data by an amount by which the data synchronizing signal 52 is expanded for detecting defect. The collation pattern 124 is for detecting the data-synchronizing signal 52. The outputs of the data-synchronizing signal detector 115 and of the data-synchronizing signal detector 116 for detecting defect, are fed to a selector 117. Selector 117 selects the signal depending upon whether or not the operation mode is normal mode or defect detection mode for detecting a defect. The output of the selector 117 is fed to the code demodulator 114 and provides reference timing for demodulating the code of the data discrimination output. The code demodulator 114 produces demodulated code at the reproduced data output 122.

Data-synchronizing signal detector 115 provides detection when the data-synchronizing signal 52 is expanded for detecting the defect. Further, by requiring all bits in the region of the data-synchronizing signal to be in agreement to establish data synchronization, small errors can be excluded, making it possible to precisely detect the defect at a position where the data-synchronizing signal is likely to be written. A concrete method of detecting the data-synchronizing signal is, for example, the one which regards that the data are brought into synchronism only when all bits in the region of the data-synchronizing signal 52 are brought into agreement. In this case, a rough error rate in the data-synchronizing signal is an average bit error rate which is multiplied by a number of the increased collation bits. This is to lower the detection rate of the data-synchronizing signal in detecting defect and is, in other words, equivalent to increasing the error rate of detecting in the data-synchronizing signal at the time of detecting the defect. This resembles the art disclosed in the above Japanese Patent Laid-Open No. 216743/2001 according to which the collation portion at the time of detecting the data-synchronizing signal during the reproduction is utilized with at least either the preceding or the succeeding stored data as part of the data-synchronizing signal, but is quite different from the standpoint of intentionally lowering the performance for detecting the data-synchronizing signals.

In detection mode, defects in the enlarged data-synchronizing regions that include portions sufficiently large to take into consideration changes in rotation, can be detected in advance. In normal operating mode, only those sectors free of defects are used for the region where the data-synchronizing signal is stored. Therefore, in detecting the data-synchronizing signal in normal operating mode, there exists no defect and attention may be given to deterioration in the signals due to noise. Accordingly, little error occurs in detecting the data-synchronizing signals, which is an improvement in the performance for detecting the data-synchronizing signals. Upon detecting the defect in the data-synchronizing signals according to the invention, the number of collation bits is decreased in the data-synchronizing signal detector 115 that are used for normally reproducing the data by an amount of improvement in the performance for detecting the data-synchronizing signals. This makes it possible to decrease the area for the data-synchronizing signal while maintaining the performance for detecting the data-synchronizing signal. The amount of decrease in the region for the data-synchronizing signal can be utilized for storing the information. This makes it possible to improve the format efficiency and to increase the storage capacity of the information storing/reproducing device. Alternatively, the storage density per unit area of information is decreased by a decrease in the region for the data-synchronizing signal, and error in the data is decreased, making it possible to improve not only the performance for detecting the data-synchronizing signal but also the reliability for storing and reproducing information of the information storing/reproducing device.

Further, immunity is improved for the defects that occur in the region of the data-synchronizing signal with the passage of time. When a defect is detected, only those sectors without defects can be used for storing data-synchronizing signals. This reduces the probability that a defect will occur with passage of time.

The storing position of the storage medium and the format according to the second embodiment of the invention will be described again by using part of FIG. 1. The first embodiment of the invention has used the data-synchronizing signal 52 for detecting the defect shown in the format 21. In the second embodiment of the invention, format 22 is used, but data synchronization is established by collating a pattern over a range represented by a collation range 61. In other words, the final part of the PLO-SYNC 51, the data-synchronizing signal 52 and the head part of the DATA portion 53 are collated. In detecting the defect, known data stored in these regions can be used and can be set as the collation pattern. The collation range 61 for detecting the defect is set to be equal to the range of the data-synchronizing signal 52 for detecting the defect in the first embodiment of the invention, thereby obtaining similar advantages for detecting defects as described in the first embodiment of the invention. The pattern of PLO-SYNC 51 and the head portion of the DATA portion 53 may have the same pattern. Alternatively, the patterns may be selectively set such that the defect can be easily detected, thereby improving precision for detecting defects.

Figure 2:
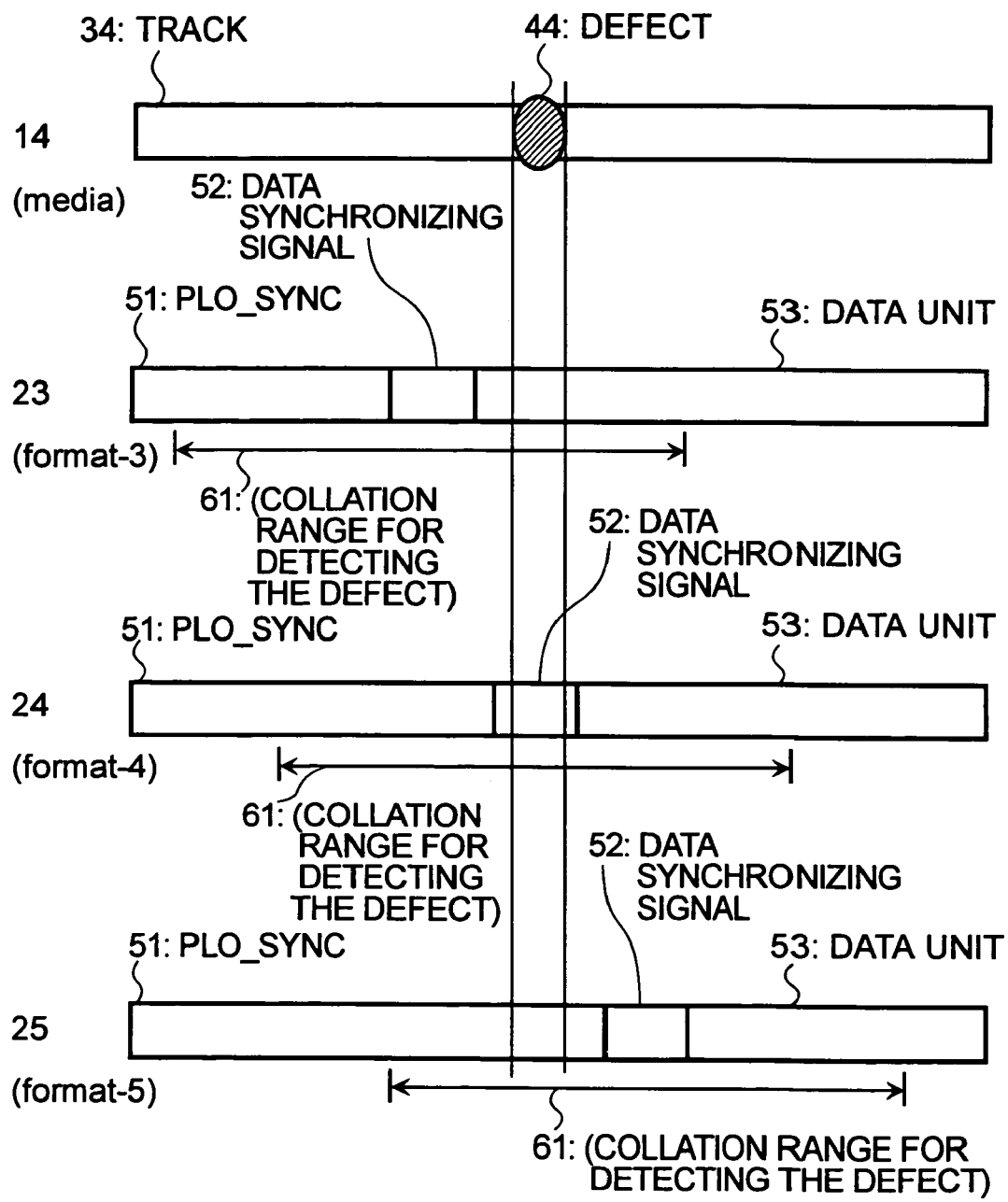
FIG. 2 is a schematic diagram illustrating the operation of a collation pattern necessary for detecting defect in the data-synchronizing signal portion according to the defect detecting method of a second embodiment of the invention.

FIG. 2 illustrates the length of the collation pattern according to one embodiment of the invention. The recording medium 14 of FIG. 2 depicts part of the track in which information is stored on the recording medium. Track 34 contains a defect 44 that is not suited for storing or reproducing information at a portion shown. Examples of the format with which information is stored in the track 34 are formats 23, 24, and 25. Each format includes PLO-SYNC 51, data-synchronizing signal 52 and DATA portion 53. There is further shown a collation range 61 for detecting the defect.

The formats 23, 24, and 25 are different in regard to a positional relationship relative to the storage medium 14. Format 23 is the case of when information is stored on the front side, format 25 is the case of when information is stored on the rear side, and format 24 is the case of when information is stored at an average position. The position where the data is stored is changed when detecting defects. Even when the data is stored like that of the format 23 due to a change in the rotation when the defect is detected, it is necessary to take into consideration a change in the rotation at the time of normally storing or reproducing the data. In other words, in the worst case, it is probable that the data is normally stored at a position of the format 25. In this case, too, the position where the data-synchronizing signal 52 is written must be detected when the defect is detected. Therefore, the rear side of the collation range 61 for detecting the defect has a length that includes up to the data-synchronizing signal 52 of the format 25. Similarly, even when the data is stored like in the format 25 due to a change in the rotation when the defect is detected, it is necessary to take into consideration a change in the rotation at the time of normally storing and reproducing the data. Concretely speaking, in the worst case, it is probable that the data is normally stored at a position of the format 23. In this case, too, the position where the data-synchronizing signal 52 is written must be detected when the defect is detected.

Therefore, the front side of the collation range 61 for detecting the defect has a length that includes up to the data-synchronizing signal 52 of the format 23. This means that a length twice as great as the range for permitting a change in the rotation is necessary before and after the data-synchronizing signal 52. This is based on the presumption that, when a defect is detected, a change in the rotation occurs in the same amount even when the data are normally stored or reproduced. The defect is detected in a step of manufacturing the device, and is usually detected in a stable state precluding causes of change as much as possible. Therefore, the amount of change in the defect detection can be suppressed to be very smaller than that of normally storing or reproducing the data. Ideally, there should be no change. If these are taken into consideration, a length of a range for permitting the change in the rotation at the time of normally storing and reproducing the data, is at least necessary before and after the data-synchronizing signal 52. This also makes it possible to adopt further ideas. Namely, there can be realized a method of realizing the idea by investing much equipment for minimizing the change in the rotation when a defect is detected, and a method without using any particular equipment (without investing equipment) by letting the defect detected over a length twice as large as the range of permitting a change in the rotation before and after the data-synchronizing signal 52. This also holds true for other embodiments inclusive of the first embodiment.

Figure 4:
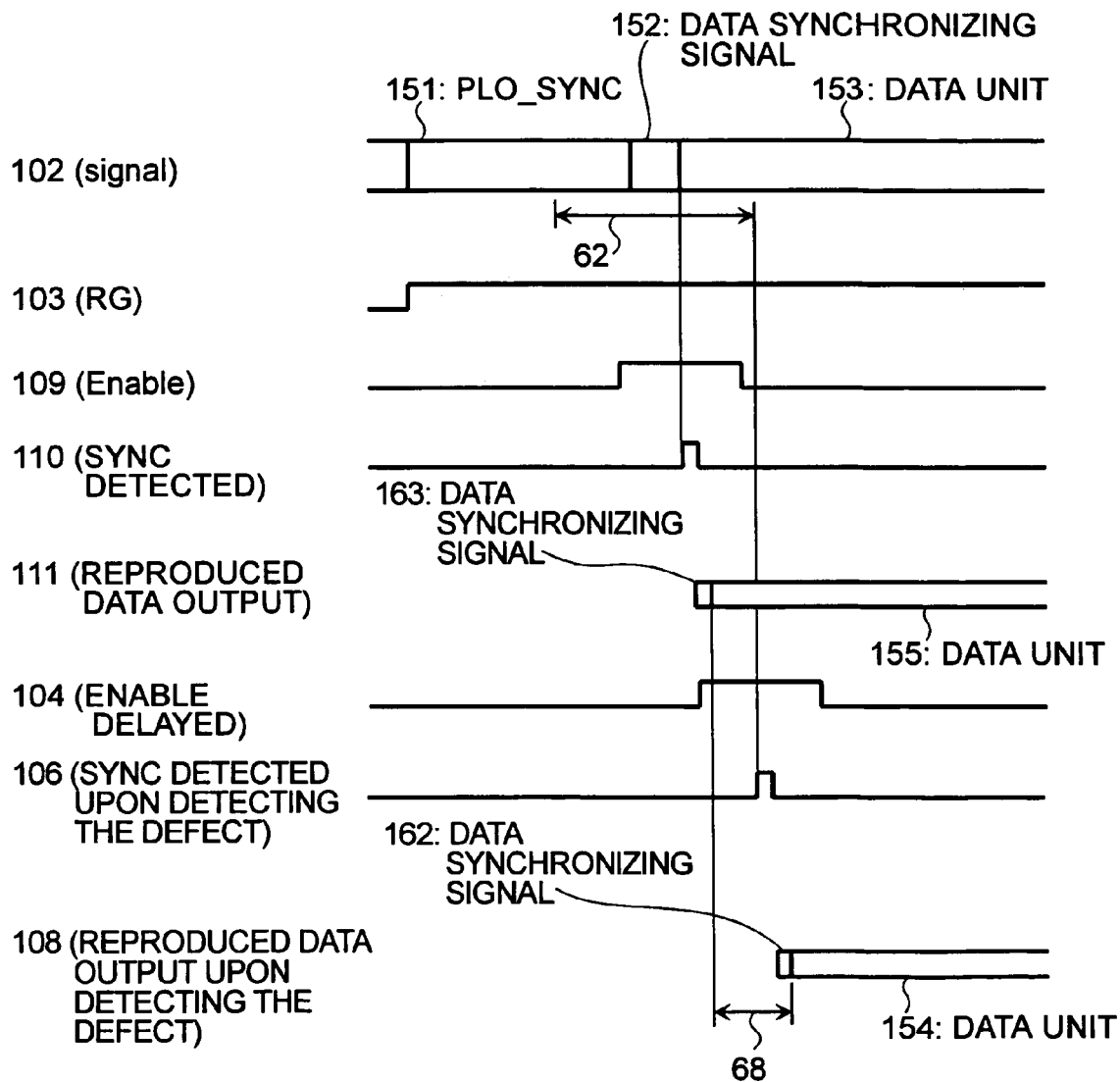
FIG. 4 is a time chart illustrating signals at each of the portions and sequences used for controlling timings for detecting the data-synchronizing signal according to the defect detecting method of the second embodiment of the invention.

FIG. 4 shows the time chart of the case when the defect is detected by using the format 22 of FIG. 1. There is a reproduced signal 102 obtained by reproducing the stored data like that of the format 22. The reproduced signal 102 is such that when the RG 103 becomes active for conducting the reproducing operation, there are reproduced PLO-SYNC 51, data-synchronizing signal 52 and DATA portion 53 which correspond to the PLO-SYNC 151, data-synchronizing signal 152 and DATA portion 153 in the format 22. Here, data synchronization must be detected by collating the pattern over a collation range 62 in the final portion of the PLO-SYNC 151, in the data-synchronizing signal 152, and in the head part of the DATA portion 153. The enable signal 104 is delayed. If the collation range 62 is detected during this period, the SYNC detection output 106 is produced when the defect is detected. Due to the SYNC detection output 106 at the time of detecting the defect, there is produced the reproduced data output 108 including a DATA portion 154 of a signal obtained by demodulating the code of the data-synchronizing signal 162 and of the DATA portion 153.

With the SYNC detection output 106 being produced when the defect is detected, there is no defect in the collation range 62 for detecting the defect inclusive of the data-synchronizing signal 52. Like the first embodiment, the enable signal 104 has a collation range 62 for detecting the defect expanded to be longer than the data-synchronizing signal 152 in the normal data reproduction without detecting defect and must, hence, be delayed behind the enable signal for detecting the data-synchronizing signal 152. To demodulate the DATA portion 153 in the reproduced signal from the head portion thereof, further, the signal of the DATA portion 153 must be delayed. As represented by a delay time 68, the amount of delay is in agreement with the length of the head portion of the DATA portion 153 used as the collation range 62 for detecting the defect.

The enable signal 109 for detecting the data synchronizing signal 152 in normally reproducing the data, SYNC detection output 110 and reproduced data output 111 become as shown.

Figure 6:
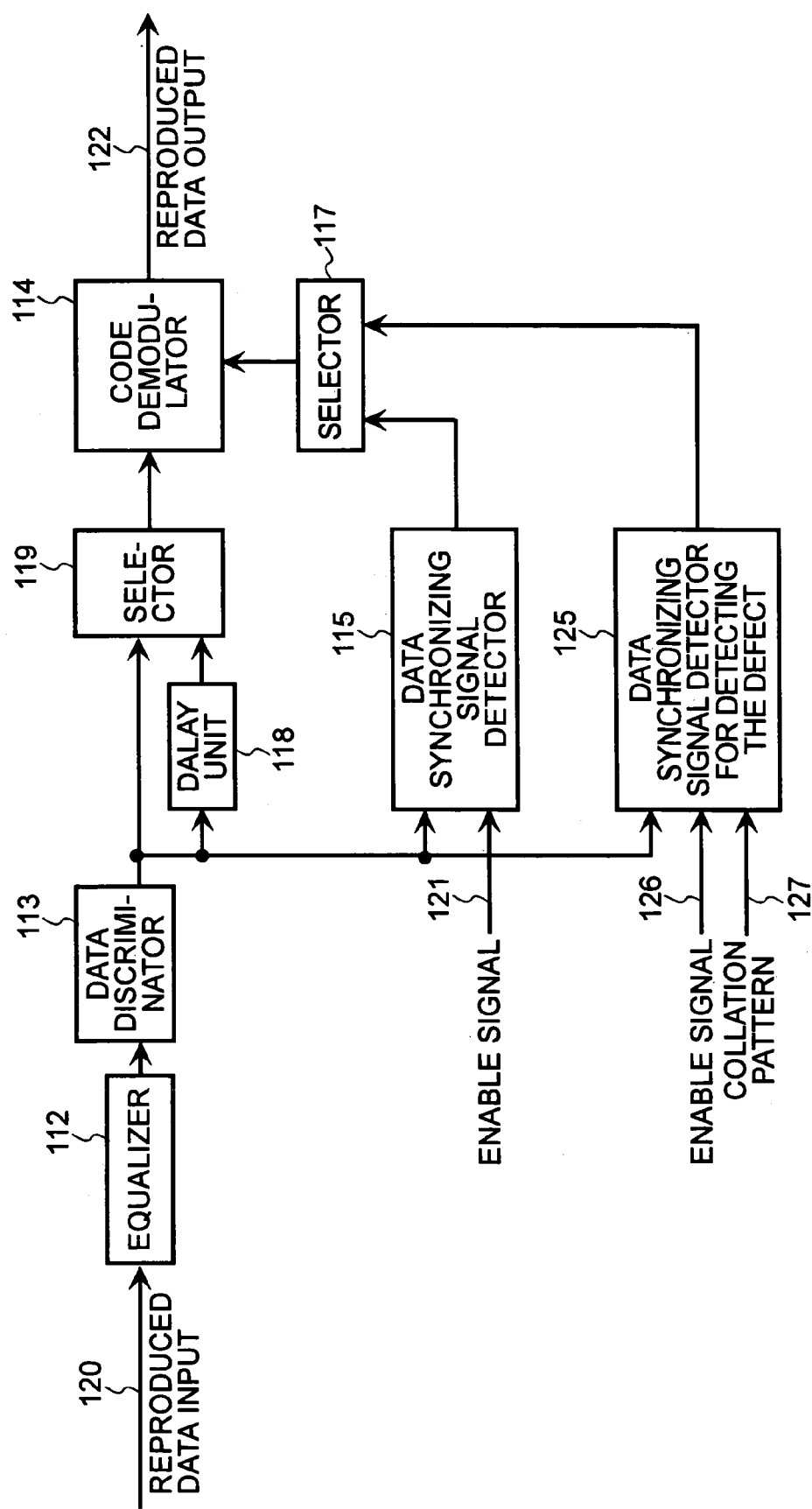
FIG. 6 is a block diagram illustrating a constitution of the defect detecting device for carrying out the defect detecting method according to the second embodiment of the invention.

Next, described below with reference to FIG. 6 is the constitution of the defect detecting device according to the second embodiment. FIG. 6 is a diagram illustrating the constitution of the reproduction system inclusive of data-synchronizing signal detection means for the defect detecting device. Information constituted like the format 22 of FIG. 1 is reproduced, and is inputted to the equalizer 112 as a reproduced data input 120. The equalizer 112 equalizes the signals and outputs them. A data discriminator 113 receives the output from the equalizer, discriminates the data, and produces a result of data discrimination. The output of data discrimination is inputted into a selector 119, a delay unit 118, a data synchronizing signal detector 115 and to a data-synchronizing signal detector 125 for detecting defect. The data-synchronizing signal detector 115 is a data-synchronizing signal detection means which is used for normally reproducing the data, and receives an enable signal 121. If necessary, it also receives parameters for detecting data-synchronizing signals.

The data-synchronizing signal detector 125 for detecting defect is a data-synchronizing signal detector means used for detecting defect, and receives an enable signal 126 and a collation pattern 127. The enable signal 126 is for delaying the enable signal 121 during the normal reproduction of data by the length of the head portion of the DATA portion 53 used as the collation range 61 for detecting the defect. The collation pattern 127 is for detecting, by pattern collation, the patterns of the final portion of the PLO-SYNC 151 for the collation range 62 for detecting the defect, data-synchronizing signal 152 and the head portion of the DATA portion 153. The data-synchronizing signal detection outputs of the data-synchronizing signal detector 115 and of the data-synchronizing signal detector 125 for detecting defect, are fed to a selector 117. The delay unit 118 delays the data discrimination output by a length of the head portion of the DATA portion 153 used as the collation range 62 for detecting the defect. The delayed data discrimination output is inputted to the selector 119. The selector 119 selects either the data discrimination output or the delayed data discrimination output, and feeds to it the code demodulator 114. The selector 117 selects the signal depending upon whether or not the operation mode is the one for detecting the defect. The output of the selector 117 is fed to the code demodulator 114 and is used as a reference timing for demodulating the code of the data discrimination output. The code demodulator 114 produces the reproduced data output 122 of which the code is demodulated.

During defect detection, the selector 117 selects the output of the data-synchronizing signal detector 125 for detecting the defect, and the selector 119 selects the delayed data discrimination output. Then, the code is demodulated for the signals from the head of the DATA portion 53. During the normal reproduction, the selector 117 selects the output of the data-synchronizing signal detector 115, and the selector 119 selects the data discrimination output that has not been delayed. Then, the code is correctly demodulated for the signals from the head of the DATA portion 53. The reproduced data output 122 of which the code is demodulated is produced at different timings depending upon during the detection of the defect or during the normal reproduction. Upon providing the data-synchronizing signal detection means for detecting defect, it is allowed to detect the defect by pattern collation over a range expanded to be wider than the normal range for detecting the defect. Upon strictly detecting the collation range 62 for detecting the defect, further, even a small error is precluded as much as possible to precisely detect the defect at a position where the data-synchronizing signal is likely to be written. A concrete method of detecting the data-synchronizing signal may be the one which regards that the data are in synchronism only when all bits are in agreement in the region of the collation range 62 for detecting the defect.

The defect-detecting device according to a third embodiment of the invention will be described next with reference to the drawings.

Like the second embodiment of the invention, the third embodiment of the invention uses the format 22 of the structure same as that of the case of normally reproducing the data of FIG. 1. The data-synchronizing signal, too, is detected in the same manner as the case of normally reproducing the data. Here, however, the presence of error is detected by conducting a separate pattern collation over a range represented by the collation range 61 for detecting the defect. In particular, the patterns are collated concerning the end portion of the PLO-SYNC 51, data-synchronizing signal 52 and head portion of the DATA portion 53. In this case, too, the defect is detected. Therefore, known data are used and are set as collation patterns. The collation range 61 for detecting the defect is set to be equal to the range of the data-synchronizing signal 52 for detecting the defect in the first embodiment of the invention to exhibit the effect of detecting the defect as the one described in the first embodiment of the invention. Here, the data may be such that the pattern of the PLO-SYNC 51 is the same as the pattern of the head portion of the DATA portion 53.

Figure 7:
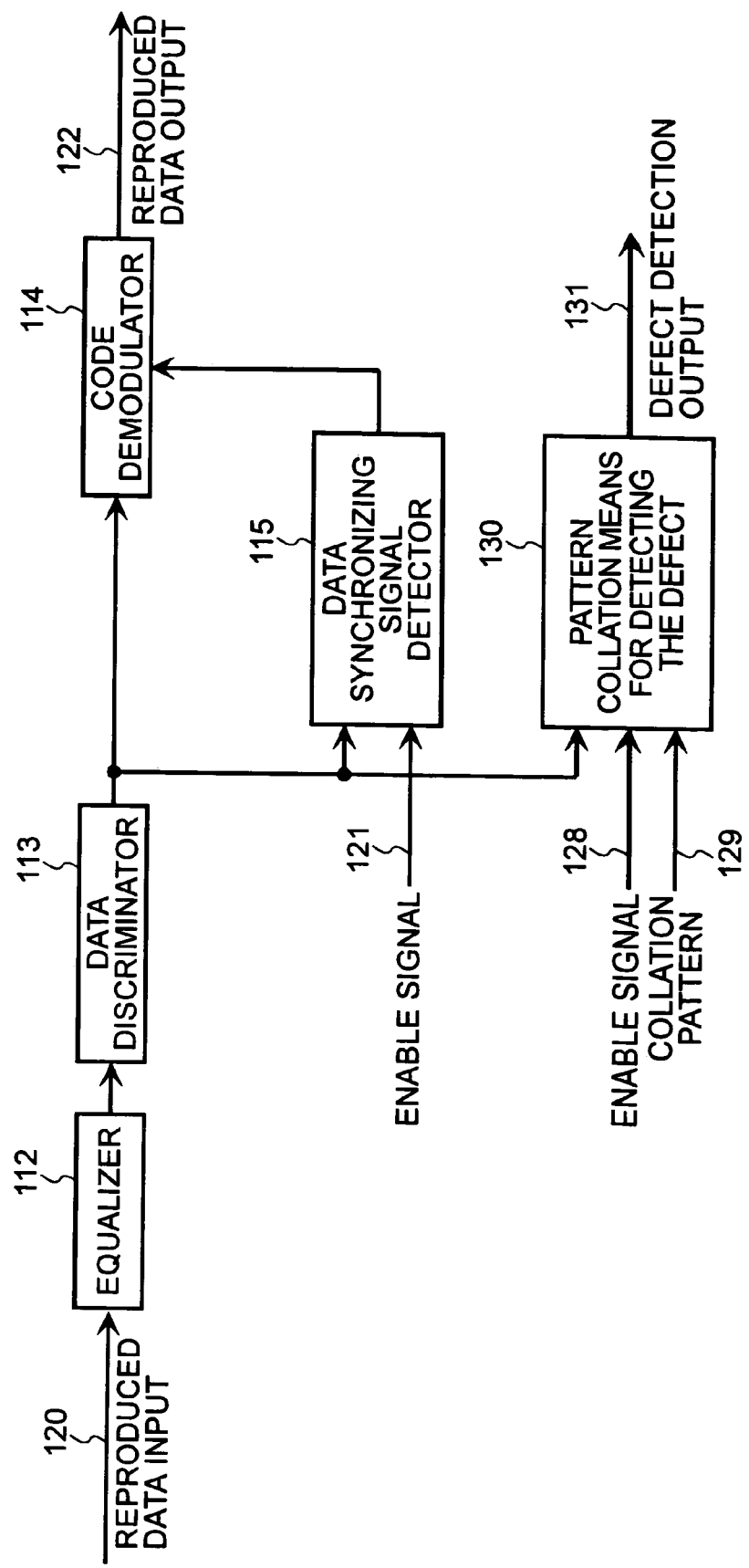
FIG. 7 is a block diagram illustrating a constitution of the defect detecting device for carrying out the defect detecting method according to a third embodiment of the invention.

Next, described below with reference to FIG. 7 is the configuration of the defect detecting device according to the third embodiment. FIG. 7 is a diagram illustrating the constitution of the reproduction system inclusive of data-synchronizing signal detection means for the defect detecting device. Information constituted like the format 22 of FIG. 1 is reproduced, and is inputted to the equalizer 112 as a reproduced data input 120. The equalizer 112 equalizes the signals and outputs them. A data discriminator 113 receives the output from the equalizer, discriminates the data, and produces a result of data discrimination. The output of data discrimination is inputted to a code demodulator 114, a data synchronizing signal detector 115 and to a pattern collation means 130 for detecting defect. The data-synchronizing signal detector 115 is a data-synchronizing signal detection means which is used for normally reproducing the data, and receives an enable signal 121. If necessary, it also receives parameters for detecting data-synchronizing signals. The data-synchronizing signal detection output of the data-synchronizing signal detector 115 is inputted to the code demodulator 114 and is used as a reference timing for demodulating the code of the data discrimination output. The code demodulator 114 produces a reproduced data output 122 of which the code is demodulated. The pattern collation means 130 for detecting the defect is [for detecting the presence of error in the result of data discrimination when a defect is detected, and receives an enable signal 128 and a collation pattern 129. The enable signal 128 is for delaying the enable signal 121 during the normal reproduction of data by the length of the head portion of the DATA portion 53 used as the collation range 61 for detecting the defect. The collation pattern 129 is for detecting the [defect by collating the pattern 129 with the patterns of the final portion of the PLO-SYNC 51 for the collation range 61 for detecting the defect, of the data-synchronizing signal 52 and of the head portion of the DATA portion 53.] When the data discrimination output is not in agreement with the collation pattern 129 during the period in which the enable signal 128 is active, it is so regarded that an error is occurring, and a defect detection output 131 is produced. When the defect detection output 131 is produced, it means that the defect is detected even though the data could be reproduced, and the defect is precisely detected in the data-synchronizing signal portion.

Figure 8:
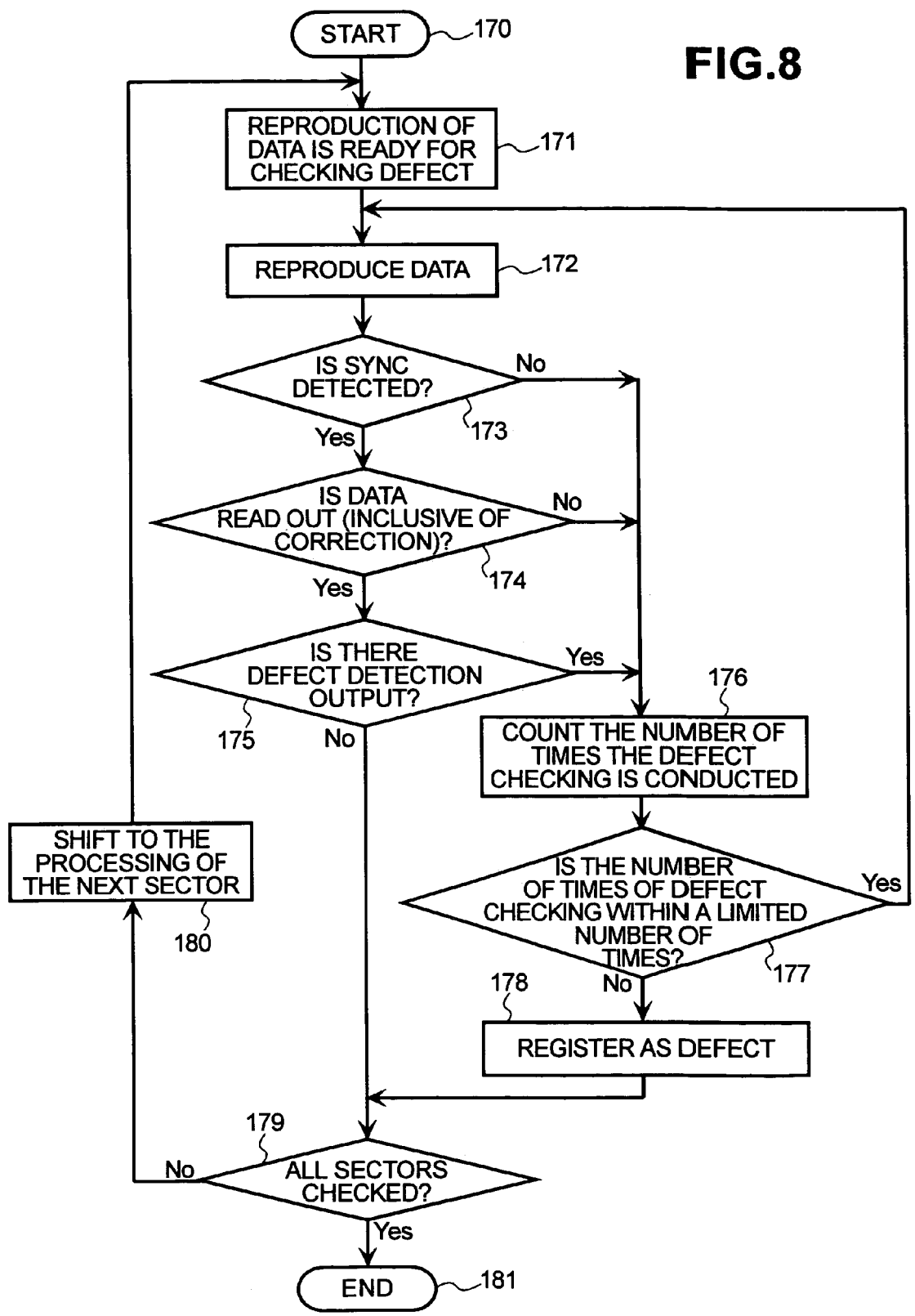
FIG. 8 is a flowchart illustrating the defect detecting method according to a fourth embodiment of the invention.

FIG. 8 is a flowchart illustrating a defect detection method according to a fourth embodiment of the invention.

The defect detecting processing starts with step 170, and the reproduction of data is made ready at step 171 for detecting the defect. At this step, for example, a parameter is set for reading the data, a correction number is set for correcting error to detect the defect, the data sector (track) is sought, and the checked data are written by the storage system. When ready, the inspected data are reproduced at step 172 by the reproduction system. Here, a series of reproducing operations are conducted inclusive of drawing the PLL and detecting the data-synchronizing signal. Whether or not the data-synchronizing signal is detected is judged at step 173. Here, the detection of the data-synchronizing signal stands for the detection of the data-synchronizing signal of the invention by collating the patterns over a wide range inclusive of the data-synchronizing signal for detecting the defect, which is longer than the normal data-synchronizing signal, end portion of the PLO-SYNC, data-synchronizing signal and head portion of the DATA portion as is done in the above first to third embodiments.

When the data-synchronizing signal is detected at step 173, it is further judged at step 174 whether or not the data can be correctly read out. It is determined whether or not the data are correctly read out inclusive of correction by using an error correction code. Here, the number of correcting errors by using the error correction codes affects the quality for detecting the defects. It is therefore important to set a suitable value. When the data is correctly read out at step 174, it is judged at step 175 whether or not there is a defect detection output concerning the data-synchronizing signal. When the detection of the data-synchronizing signal at step 173 is the detection of the data-synchronizing signal for detecting the defect, which is longer than the normal data-synchronizing signal, or is the detection of the data-synchronizing signal including the final portion of the PLO-SYNC, data-synchronizing signal, and head portion of the DATA portion, then, step 175 may be omitted. When the detection of the data-synchronizing signal at step 173 is the normal detection of the data-synchronizing signal including retry, it becomes essential to detect the defect related to the data-synchronizing signal at step 175. When there is no defect detection output related to the data-synchronizing signal at step 175, it is judged at step 179 whether or not all sectors are checked for defect. When the sectors are all checked for the defect, the routine ends at step 181.

When the sectors have not all been checked for the defect at step 179, the processing is shifted to the next sector at step 180. The processing is repeated again from the step 171. When the data-synchronizing signal has not been detected as a result of judgement at step 173, when error has occurred so much that the data are not correctly reproduced as a result of judgment at step 174, or when a defect detection output is produced in the data-synchronizing signal as a result of judgment at step 175, the number of times the defect detection processing is executed for the sector is counted at step 176. It is judged at step 177 if the number of times of executing the defect detection processing is within a limited number of times. When it is within the limited number of times, the processing is repeated from step 172. The processing at steps 176 and 177 are based on a prerequisite of attempting the defect detection processing a plural number of times for one sector. When a defect is judged by the detection of one time, the processings at steps 176 and 177 are not necessary. When the number of times the defect detection processing is executed at step 177 exceeds a limit number of times, it is registered as a defect of the sector at step 178. The routine, then, proceeds to step 179 where it is judged whether all sectors are checked.

When the data-synchronizing signal has not been detected as a result of judgment at step 173, when error has occurred so much that the data are not correctly reproduced as a result of judgment at step 174, or when a defect detection output is produced in the data-synchronizing signal as a result of judgment at step 175, these cases are all handled in the same manner, and the number of times the defect detection processing is executed for the sector is counted at step 176. Here, however, it is also allowable to separately count the number of processings at steps 173, 174 and 175, and to change the processings for each of the results of judgment at steps 173, 174 and 175.

Figure 9:
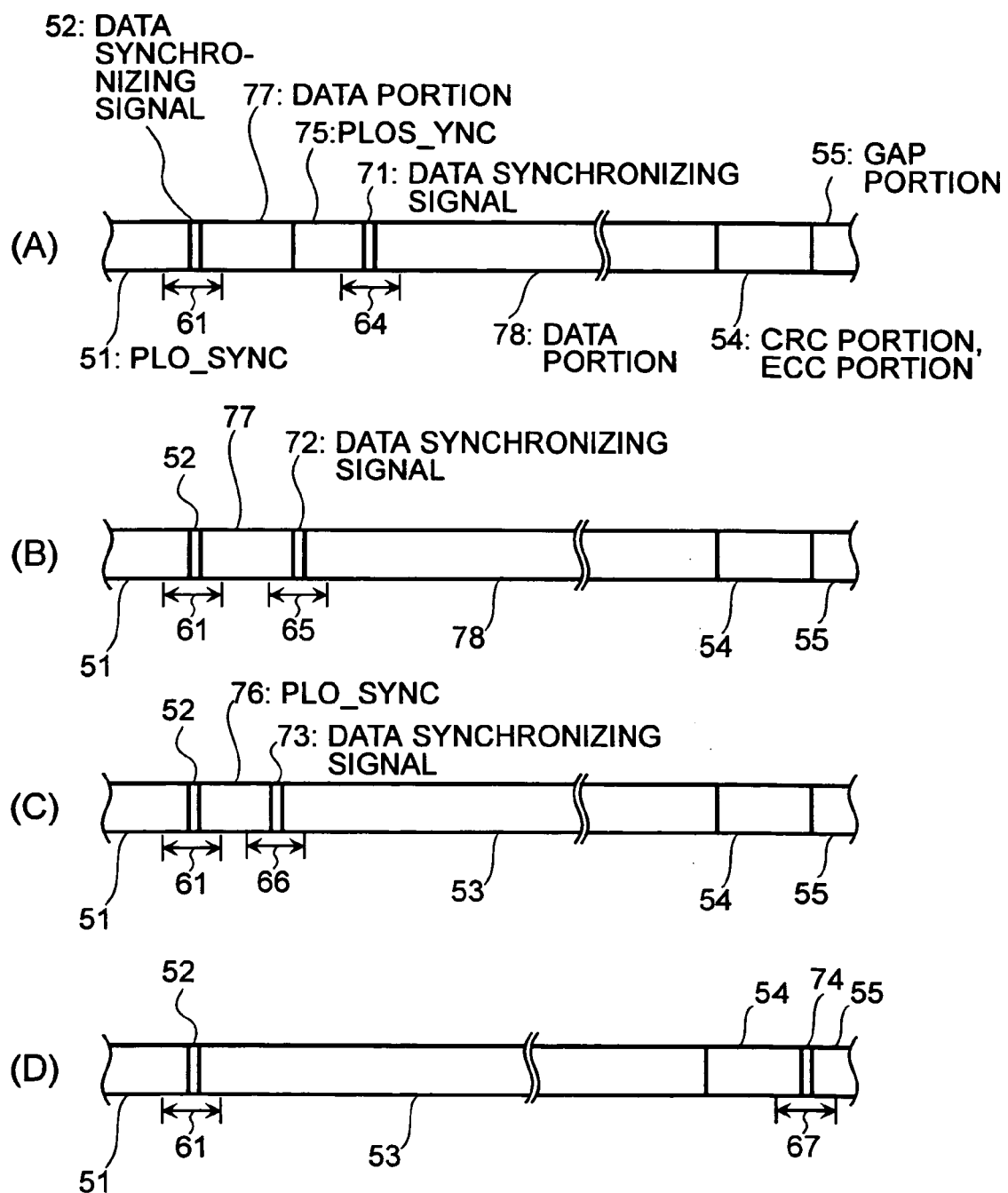
FIGS. 9A to 9D are schematic diagrams illustrating the cases where a modified example of the defect detecting method of the second embodiment of the invention is applied to various formats.

As a fifth embodiment, the invention may be adapted to the data format having a plurality of data-synchronizing patterns as disclosed in U.S. Pat. No. 5,844,920. FIG. 9 illustrates an example of when the invention is applied to the format in the case of storing the data into, or reproducing the data from, the storage medium.

FIG. 9A illustrates a case where the data-synchronizing signals are arranged at two places. There are included PLO-SYNC 51, data synchronizing signal 52, first DATA portion 77, second PLO-SYNC 75, second data-synchronizing signal 71, second DATA portion 78, CRC portion/ECC portion 54 and GAP portion 55. The expanded data-synchronizing signal is detected at portions of a collation range 61 and a collation range 64 for the two data-synchronizing signals, or the defect is detected for the data-synchronizing signals.

FIG. 9B illustrates the case of FIG. 9A but without including the second PLO-SYNC 75. There are included PLO-SYNC 51, data-synchronizing signal 52, first DATA portion 77, second data-synchronizing signal 72, second DATA portion 78, CRC portion/ECC portion 54 and GAP portion 55. The expanded data-synchronizing signal is detected at portions of a collation range 61 and a collation range 65 for the two data-synchronizing signals, or the defect is detected for the data-synchronizing signals.

FIG. 9C illustrates the case of FIG. 9A but without including the first DATA portion 77. There are included PLO-SYNC 51, data synchronizing signal 52, second PLO-SYNC 76, second data-synchronizing signal 73, DATA portion 53, CRC portion/ECC portion 54 and GAP portion 55. The expanded data-synchronizing signal is detected at portions of a collation range 61 and a collation range 66 for the two data-synchronizing signals, or the defect is detected for the data-synchronizing signals.

FIG. 9D illustrates a case where the data-synchronizing signals are arranged at two places, one of which being arranged behind the CRC portion/ECC portion 54. There are included PLO-SYNC 51, data synchronizing signal 52, DATA portion 53, CRC portion/ECC portion 54, second data-synchronizing signal 74 and GAP portion 55. The expanded data-synchronizing signal is detected at portions of a collation range 61 and a collation range 67 for the two data-synchronizing signals, or the defect is detected for the data-synchronizing signals.

In addition to the above, there can be exemplified the one of a combination thereof and the one in which the data-synchronizing signals are arranged at an increased number of places. It is further allowable to realize the constitution in which they are applied to a format of the split sector type in which the data sectors are divided depending upon the servo regions.

The invention can be further easily realized upon the combination with the third embodiment. In the second data-synchronizing signal portion, in particular, the pattern may be collated for detecting the defect instead of detecting the data-synchronizing signal, obviating the need to do complex processing.

Here, further, the expanded data-synchronizing signals are detected at two places for the data-synchronizing signal portions at two places. In practice, however, it is probable that the places for detecting the expanded data-synchronizing signals may overlap one upon the other due to the length of expansion corresponding to the amount of change in the rotation and due to the lengths of PLO-SYNC and data portion. In such a case, they may be grouped into one to execute.

Figure 10:
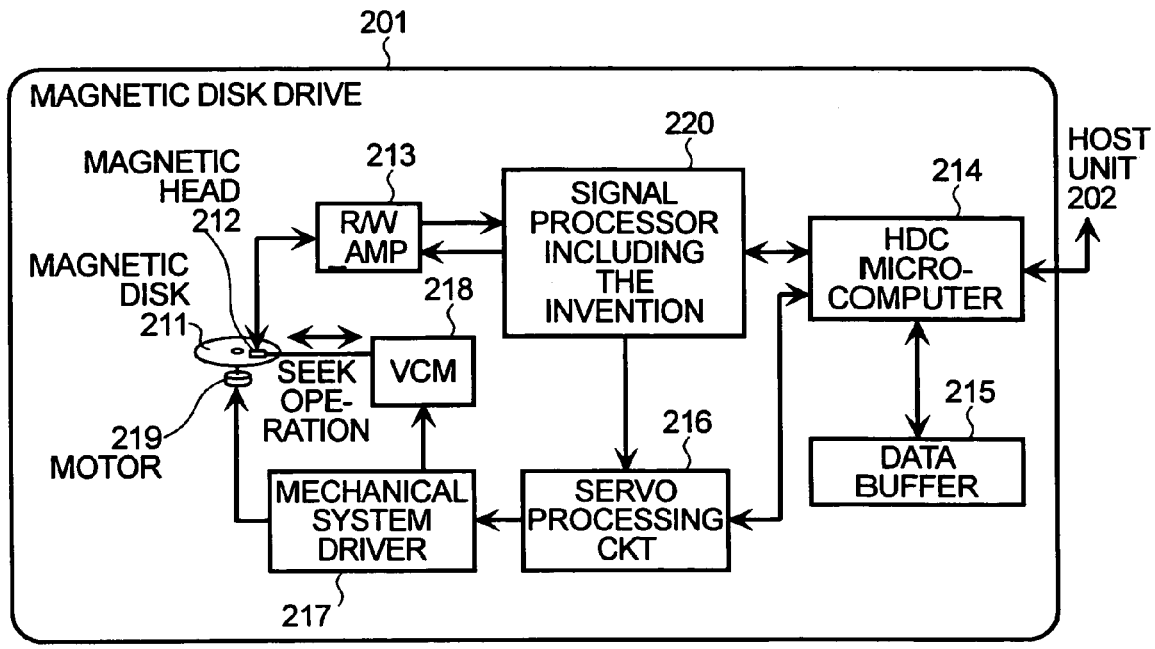
FIG. 10 is a block diagram illustrating a constitution of a magnetic disk drive for effecting the defect detecting method of the invention.

FIG. 10 is a diagram of the magnetic disk drive according to a sixth embodiment of the invention, which uses the first to fifth embodiments.

The magnetic disk drive 201 includes a magnetic disk 211, a magnetic head 212, an R/W-AMP 213, an HDC microcomputer 214, a data buffer 215, a servo processing circuit 216, a mechanical system driver 217, a VCM 218, a motor 219 and a signal processing means 220.

The magnetic disk 211 which is the information storage medium is detected for its defect according to the above first to fifth embodiments, registered for its defect at the data-synchronizing signal portion, and uses only those sectors having very small defects for the data-synchronizing signal portion to store and reproduce information. The signal processing means 220 includes such means as storage system and reproduction system for detecting the defect according to the first to fifth embodiments. Particularly related is a portion for detecting the data-synchronizing signal.

The magnetic disk drive 201 of this constitution uses only those sectors which enable the defect in the information storage medium to be precisely detected in the data-synchronizing signal portion. Therefore, there is realized a magnetic disk drive featuring less error for detecting the data-synchronizing signals.

Figure 14:
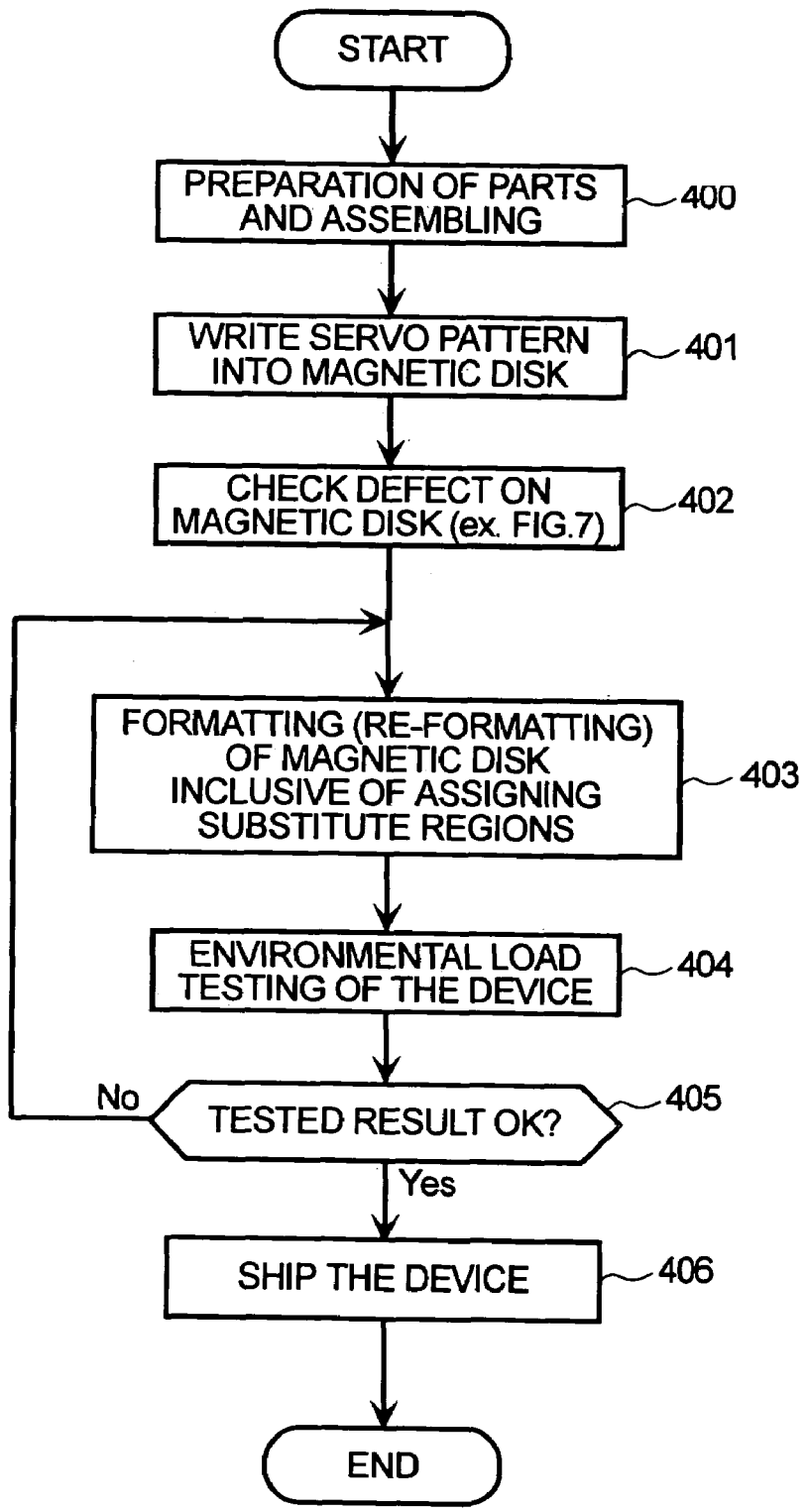
FIG. 14 is a flowchart illustrating the production steps including a step of detecting defect in the magnetic disk drive for executing the defect detecting method of the invention.
Figure 15:
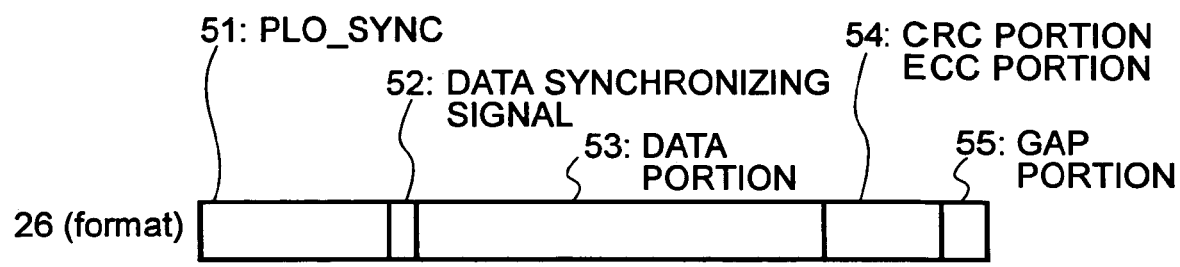
FIG. 15 is a diagram schematically illustrating a general format in the information storage medium according to technology referred to for the invention.

Described below with reference to a flowchart of FIG. 14 are steps of producing the magnetic disk drive for executing the defect detecting method according to the embodiment.

After the parts such as magnetic disk and magnetic head are prepared and assembled (step 400), servo patterns are written into the magnetic disk 211 in a state where it is incorporated in the magnetic disk drive 201 (step 401).

Thereafter, the storage system and the reproduction system of the signal processing means 220 of the magnetic disk drive 201 itself are placed in the defect detection mode to execute the detection of defect on the magnetic disk 211 (step 402) as illustrated in the flowchart of FIG. 7. In this case, the presence of defect on the magnetic disk 211 is judged based on whether or not the data-synchronizing signal can be detected by using the long data-synchronizing signal 52, making it possible to reliably detect even those defects that occur subsequently and latently due to a change in the rotation of the magnetic disk 211. As will be described later, a substitute region is assigned for the defective region to improve reliability of the magnetic disk 211.

Thereafter, the magnetic disk 211 including a processing for assigning a substitute region to avoid the position of the detected defect, is formatted. Here, the normal format 22 is used (step 403).

Further, the environmental load testing is conducted such as heat running (step 404). When a medium error is detected (step 405), the routine returns back to step 403 to format the magnetic disk 211 again.

The magnetic disk drive 201 that has passed the environmental load testing at step 404 is shipped (step 406).

According to the magnetic disk drive 201 of this embodiment as described above, it is made possible to highly precisely check the defect on the magnetic disk 211 by utilizing the storage system and the reproduction system in the signal processing means 220 of the magnetic disk drive 201 itself.

According to the defect detecting technology of this embodiment as described above, it is allowed to improve the precision for detecting the defect in the data-synchronizing signal portion in the information storage medium, to decrease error in the data discrimination in the data-synchronizing signal portion caused by defect and to suppress the fault in that the subsequent data are not reproduced due to error in the detection of the data-synchronizing signal.

It is further allowed to improve the performance for reproducing data of the defect detecting device, information storing/reproducing device and of the like device that rely upon the defect detecting technology of this embodiment. Use of the information storage medium to which the invention is applied makes it possible to improve the data reproduction performance.

Moreover, the patterns can be collated at one time over a range inclusive of the regions before and after the data-synchronizing signal when a defect is detected by using the pattern collation means for detecting defect. This helps decrease the steps for detecting the defect.

Further, the region of the data-synchronizing signal is decreased owing to the improvement in the performance for detecting the data-synchronizing signal, maintaining the performance for detecting the data-synchronizing signal is possible. In this case, the region of the data-synchronizing signal that is decreased is used for storing the net information (data), thereby enabling the format efficiency of the information storage medium and increased storage capacity of the information storing/reproducing device to be attained. Or, the storage density of information per unit area is decreased by a decrease in the region of the data synchronizing signal, thereby enabling the lowering error in the data, and improving not only the performance for detecting the data-synchronizing signal but also reliability for storing and reproducing information of the information storing/reproducing device to be attained.

Further, as for the defect that occurs in the region of the data-synchronizing signal with the passage of time, the latent defect is precisely detected and revealed when it is detected to decrease the factor of fault that may occur after the shipment of the information storing/reproducing device.

In the foregoing was concretely described the embodiments of the invention accomplished by the present inventors. It should, however, be noted that the invention is in no way limited to the above embodiments only but can be modified and changed in a variety of other ways without departing from the gist and scope of the invention.

The above description has dealt with the defect detecting device of the invention by using, for example, the magnetic disk drive. The defect detecting device, however, can also be used for the magnet-optic disk drive, optical disk drive and flexible disk drive. It is further allowable to incorporate the defect detecting device in the signal processing circuit and to fabricate them as an integrated circuit.

By precisely detecting the defect on the information storage medium where the data-synchronizing signal is likely to be stored, latent defect in the medium is revealed, and the reliability of the information storage medium is improved.

The processing time for detecting the defect of the information storage medium can be shortened.

Reliability of the stored data is improved upon improving the reliability of the data-synchronizing signal, and the format efficiency is improved by decreasing the region of the data-synchronizing signal portion by an amount that meets the amount of improving the reliability of the data-synchronizing signal.

What is claimed is:

1. A method of detecting defects in an information storage medium comprising the steps of:
   during a defect detection mode of operation, writing onto said information storage medium a sector that includes a first data-synchronizing signal longer than a second data-synchronizing signal included in said sector during a normal mode of operation; and
   reading the sector, and judging the sector of said information storage medium to be defective when the first data-synchronizing signal does not establish data synchronization.

2. The method of claim 1 wherein first data-synchronization signal is stored in a first region, and all bits read from the first region must be in agreement to establish data synchronization.

3. The method of claim 1 wherein the sector includes a PLO-SYNC signal portion for storing a PLO-SYNC signal for synchronizing clocks, a data-synchronization portion for storing said first or second data-synchronization signals for synchronizing data, and a data portion for storing data.

4. The method of claim 1 further comprising:
   during the normal mode of operation, generating a first control signal corresponding to the second data-synchronization signal; and
   during the defect detection mode of operation, generating a second control signal corresponding to the first data-synchronization signal having a length greater than the first control signal.

5. The method of claim 4 wherein the first control signal is received at the first input of a selector and the second control signal is received at the second input of a selector, and the output of the selector is controlled by a third control signal generated in response to a write signal.

6. A method of detecting defects in an information storage medium comprising the steps of:
   during a defect detection mode of operation, writing discrimination bits onto a sector of said information storage medium across a range including a data-synchronization signal portion for synchronizing data, and a portion preceding and succeeding said data-synchronizing signal portion; and
   collating a defect-detecting collation pattern with the sequence of discrimination bits read out from said sector, and judging said sector of said information storage medium to be defective when a correctly collated result is not obtained.

7. The method of claim 6 wherein the range is sufficiently wide to include the entire data-synchronization signal portion across the maximum change in position caused by a rotation of the storage medium.

8. The method of claim 6 wherein the sector includes a PLO-SYNC signal portion for storing a PLO-SYNC signal for synchronizing clocks and a data portion for storing data.

9. A method of detecting defects in an information storage medium comprising the steps of:
during a defect detection mode of operation, writing information onto said information storage medium in a sector that includes a PLO-SYNC signal portion for storing a PLO-SYNC signal for synchronizing clocks, a first data-synchronizing signal portion for storing a data-synchronizing signal for synchronizing data, and a data portion for storing data; and
reading a portion of the information from the sector across a region of the sector that is greater than a second data-synchronizing signal portion used during a normal mode of operation, and detecting a defect in response to the information.

10. The method of claim 9 wherein the first data-synchronizing signal portion is longer than a second data-synchronizing signal portion included in said sector during a normal mode of operation, and further comprising judging the sector of said information storage medium to be defective when the first data-synchronizing signal does not establish data synchronization.

11. The method of claim 9 further comprising:
writing discrimination bits onto the sector of said information storage medium across a range including the first data-synchronization signal portion and a portion preceding and succeeding said data-synchronizing signal portion; and
collating a defect-detecting collation pattern with the sequence of discrimination bits read out from said sector, and judging said sector of said information storage medium to be defective when a correctly collated result is not obtained.

12. The method of claim 9 further comprising repeating the reading and detecting steps when a defect is detected.

13. The method of claim 12 wherein a defect is registered when repeating the reading and detecting exceeds a limit.

14. An information storage system comprising:
an equalizer coupled to receive reproduced data;
a data discriminator coupled to an output of the equalizer;
a data synchronizing signal detector coupled to an output of the data discriminator, the data synchronizing signal detector receiving a first enable signal;
a defect detector coupled to the output of the data discriminator, the defect detector receiving a second enable signal and a collation pattern; and
a code demodulator coupled to the output of the data discriminator and an output of the data synchronizing signal detector,
wherein the data synchronizing signal detector detects data synchronization signals read from a first data-synchronizing signal portion of a sector during a normal mode of operation, and the defect detector detects information from the sector across a region greater than the first data-synchronizing signal portion during a defect detection mode of operation.

15. The information storage system of claim 14 wherein the defect detector performs a collation on the information from the region of the sector greater than the first data-synchronizing signal portion.

16. The information storage system of claim 14 further comprising a selector having a first input coupled to the output of the data synchronizing signal detector and a second input coupled to an output of the defect detector, wherein during the normal mode of operation the data synchronizing signal detector is coupled to the code demodulator to provide reference timing for demodulating the code of the data discriminator output, and during the defect detection mode of operation the defect detector is coupled to the code demodulator to provide reference timing for demodulating the code of the data discriminator output.

17. The information storage system of claim 14 further comprising:
a first selector having a first input coupled to the output of the data synchronizing signal detector and a second input coupled to an output of the defect detector;
a delay unit coupled to the output of the data discriminator;
a second selector having a first input coupled to the output of the data discriminator and a second input coupled to an output of the delay unit,
wherein during the normal mode of operation the data discriminator output is coupled to the code demodulator through the first input of the second selector and the data synchronizing signal detector is coupled to the code demodulator to provide reference timing for demodulating the code of the data discriminator output, and during the defect detection mode of operation the data discriminator output is coupled to the code demodulator through the delay unit and the second input of the second selector and the defect detector is coupled to the code demodulator to provide reference timing for demodulating the code of the data discriminator output.

18. The information storage system of claim 14 wherein sector further includes a PLO-SYNC portion and a DATA portion, and the defect detector collates the collation pattern with patterns received from a final portion of the PLO-SYNC portion, the data synchronization signal portion, and a head portion of the DATA portion of the sector.

19. The information storage system of claim 14 further comprising a magnetic disk.

20. The information storage system of claim 19 further comprising a read-write amplifier coupled between the magnetic disk and the equalizer.

* * * * *